United States Patent
Gower

[15] 3,668,746
[45] June 13, 1972

[54] HOOK HAVING SLOTTED ENTRY

[72] Inventor: Roger L. Gower, Room 302, 1191 Jefferson Davis Highway, Arlington, Va. 22202

[22] Filed: Nov. 18, 1970

[21] Appl. No.: 90,736

[52] U.S. Cl. ................................................24/230.5
[51] Int. Cl. ...............................A43c 11/08, A44b 13/00
[58] Field of Search........................24/230.5 CR, 230.5 T

[56] References Cited

UNITED STATES PATENTS

| | | |
|---|---|---|
| 1,546,430 | 7/1925 | Blitz..............................24/230.5 C |
| 1,781,975 | 11/1930 | Bray..............................24/230.5 T |
| 126,918 | 5/1872 | Badcock........................24/230.5 C |
| 975,323 | 11/1910 | Brown...........................24/230.5 C |
| 1,420,949 | 6/1922 | Schindler......................24/230.5 C |
| 1,494,289 | 5/1924 | Round............................24/230.5 |
| 3,153,829 | 10/1964 | Luketa..........................24/230.5 C |

Primary Examiner—Paul R. Gilliam

[57] ABSTRACT

Hook means for fastening a chain-bound article securely in connected position, access to the throat of the hook being gained through a slotted entry of diameter sufficiently greater than the diameter of the bar stock of the chain with which said hook is used to permit clearance of a link of such chain through said slotted entry, and thus permit rapid connection and disconnection thereof while minimizing the possibility of accidental disengagement of said hook and said chain.

4 Claims, 18 Drawing Figures

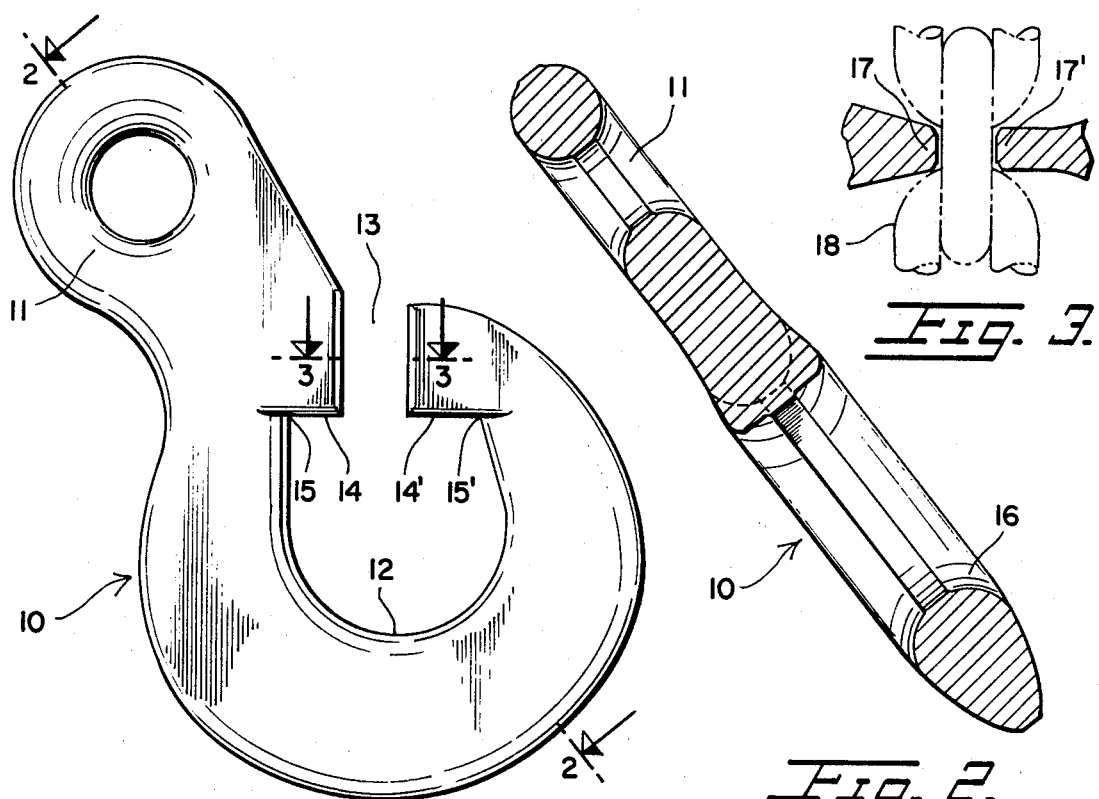
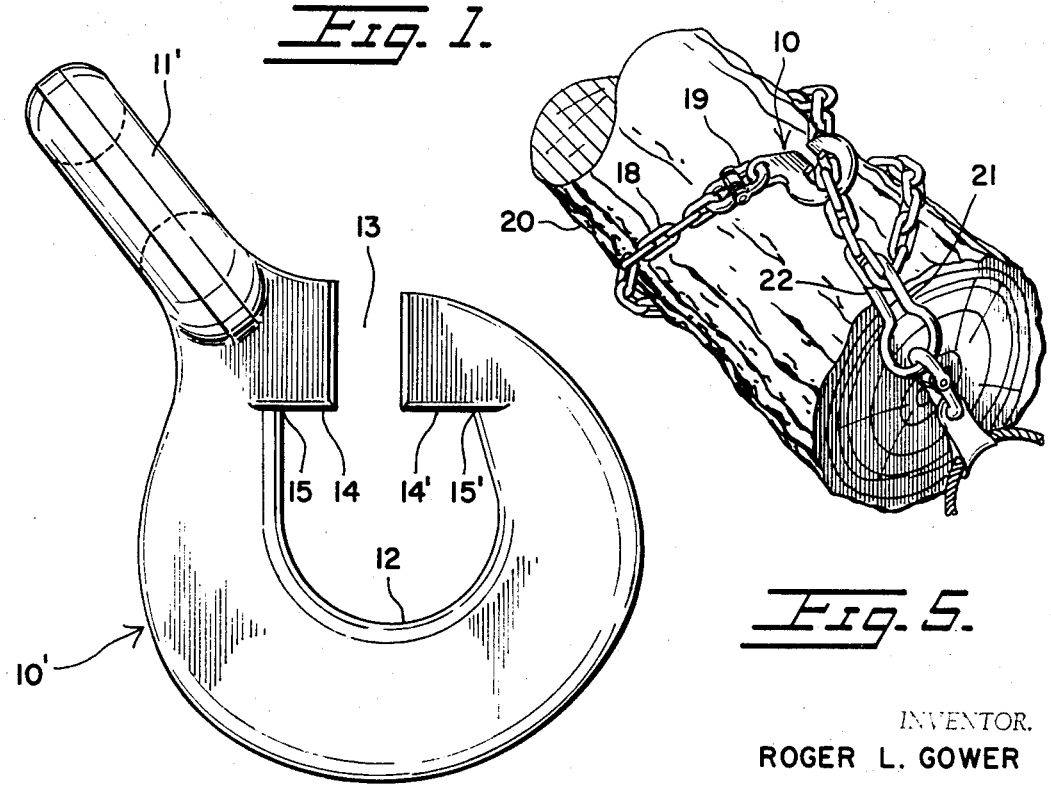

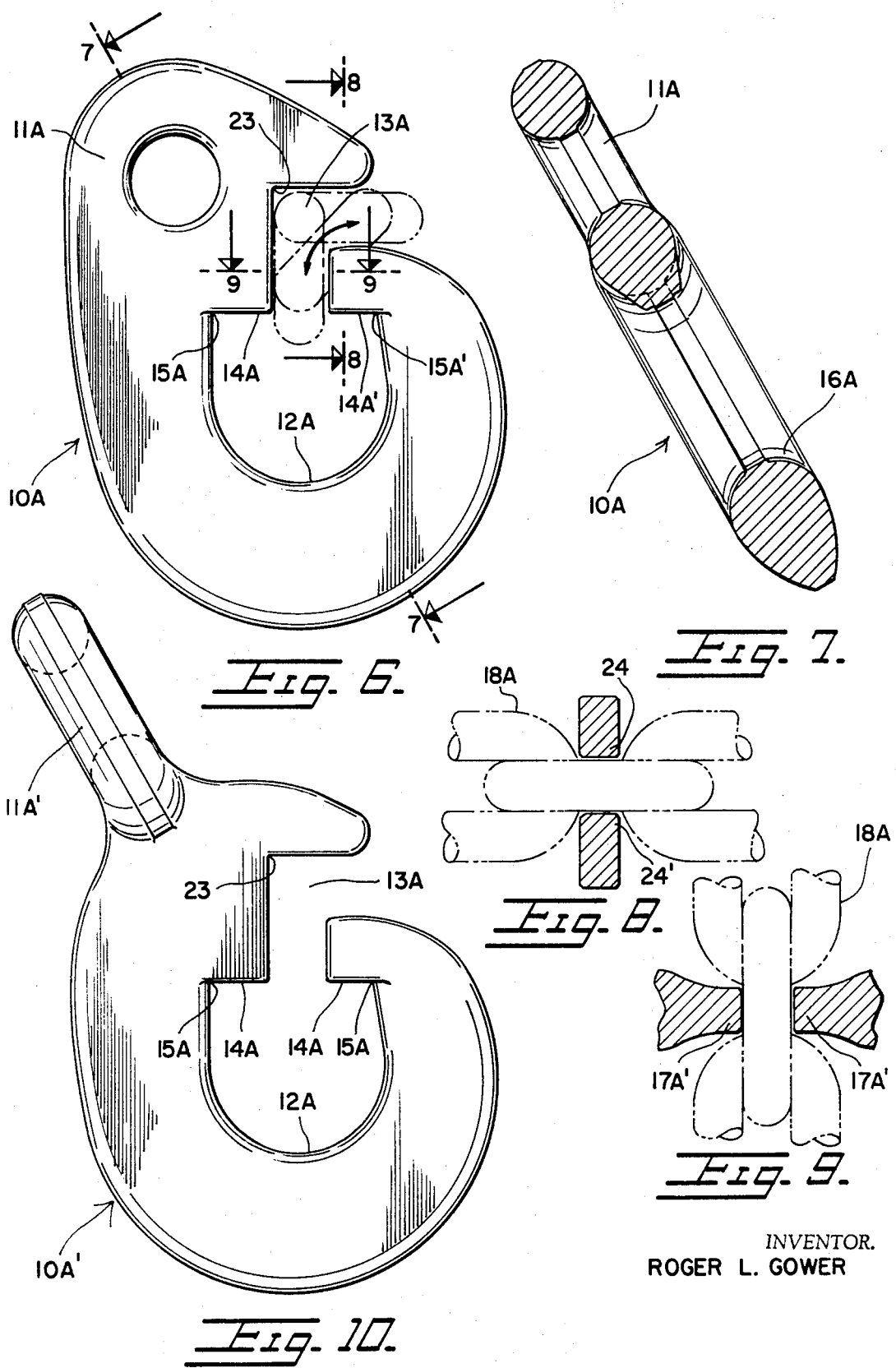

INVENTOR.
ROGER L. GOWER

INVENTOR.
ROGER L. GOWER

HOOK HAVING SLOTTED ENTRY

It is the purpose of the present invention to provide means for attaching chain in a manner commonly known as "choker chains," i.e., a chain wrapped around an object such as a log, for lifting or moving the same by a pull exerted on said chain.

This invention is a hook having at one end a ring, usually called an "eye," for attachment by any conventional means, preferably detachable but optionally welded, upon the end of a length of chain. Integrally formed with said eye is a hook member, substantially circular upon its outer periphery and having a portion of the interior, or throat, of the hook arcuately formed, and the opening of said throat being formed by a straight passage of a width to accommodate the diameter of the bar stock of a chain link, said throat having the portions adjacent said passage formed on straight lines perpendicularly or obliquely disposed with respect to said passage, and said straight lines terminating angularly where said lines meet the arcuate portion of the throat of the hook.

Choker chains are used, for example, in logging, by winding a length of chain around a log and having at one end of the chain a hook which is fastened over the extended length of chain, said extended end being then subjected to lifting or pulling action. Such lift or pull tightens the chain around the log, and the hook which is fastened over the chain is drawn more closely against the log, holding the log securely within the chain.

Hooks of conventional type, which have heretofore been used with choker chains, have wide throats which permit the chains to escape if the pull is slackened or the lifting force ceases. This may permit the log to roll away or move from the desired position. By the use of a straight passage at the mouth of the hook, a link of chain may be easily slipped into the hook, but disengagement is quite unlikely because the chain must be accurately positioned to permit a link to emerge through the passage.

With the hook of the present invention, engagement may be effected at any point on the chain that is wrapped around the log, and tightening is simplified because the chain then passes easily through the arcuately formed throat of the hook.

The only method heretofore used to prevent accidental disengagement of the end of the chain wrapped around the log was to use a ring instead of a hook. However, this necessitated pulling the entire extended length of the chain through the ring after the chain had been placed around the log, and this is a difficult and time-consuming task.

For a better understanding of the present invention, reference is made to the accompanying drawings, in which FIG. 1 is a top plan view of the hook;

FIG. 2 is a cross-sectional view taken on line 2—2 of FIG. 1;

FIG. 3 is a cross-sectional view of the entry passage, taken on line 3—3 of FIG. 1.

FIG. 4 is a top plan view of a hook of the present invention, when said hook is provided with a reverse eye, that is, the plane of the eye is perpendicular to the plane of the hook.

FIG. 5 shows the hook of the present invention in one of its uses.

FIG. 6 shows another embodiment of the hook of the present invention, wherein the entry passage achieves a 90° turn.

FIG. 7 is a cross-sectional view taken on line 7—7 of FIG. 6.

FIGS. 8 and 9 are cross-sections taken, respectively, on lines 8—8 and 9—9 of FIG. 6; and FIG. 10 shows the hook of FIG. 6 having a reverse eye, i.e., the eye is disposed transversely to the plane of the hook.

Figure 11:
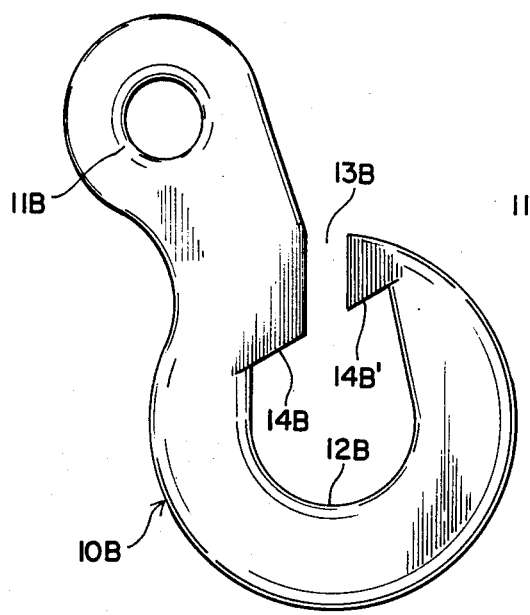
Figure 12:
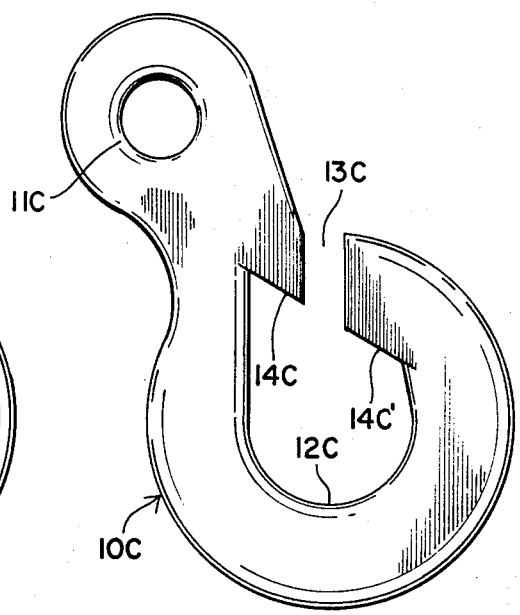

FIGS. 11 and 12 are top plan views of the hook of the present invention, having the straight side portions of the throat obliquely disposed with respect to the walls of the entry passage.

Figure 13:
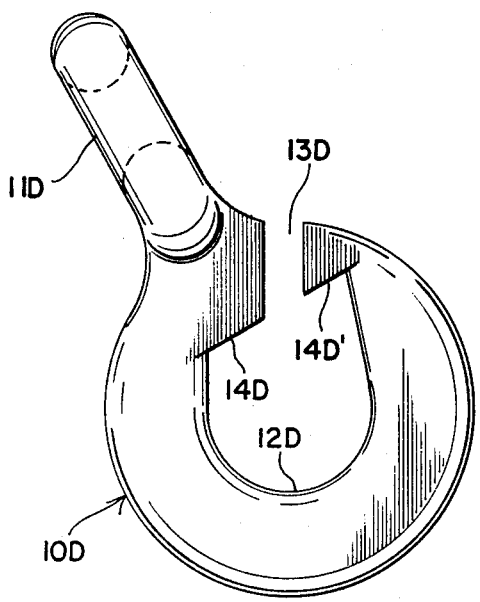
Figure 14:
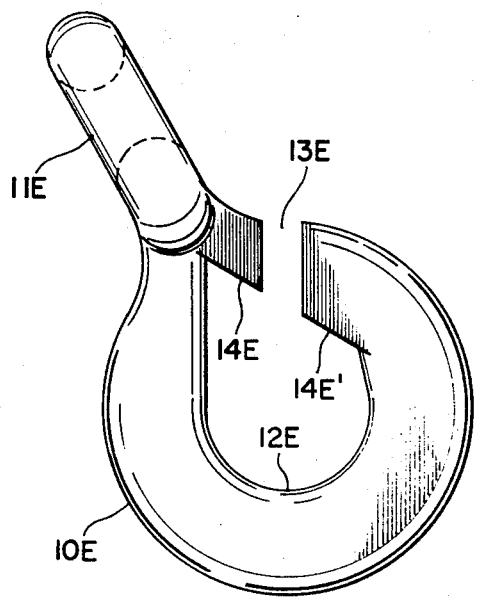

FIGS. 13 and 14 are like views, with the hook having a reverse eye.

Figure 15:
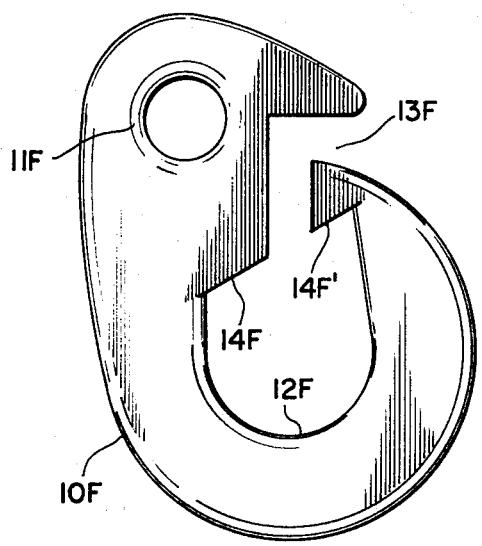
Figure 16:
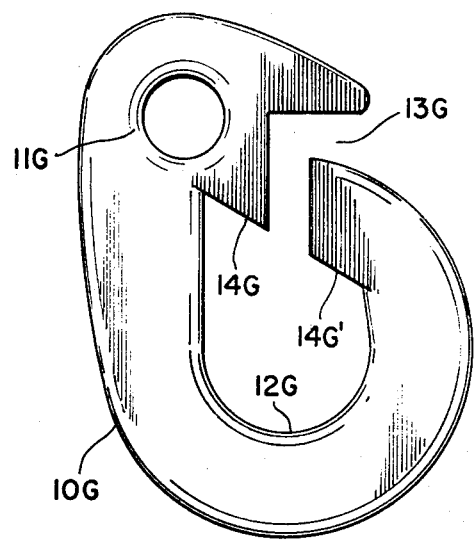
Figure 17:
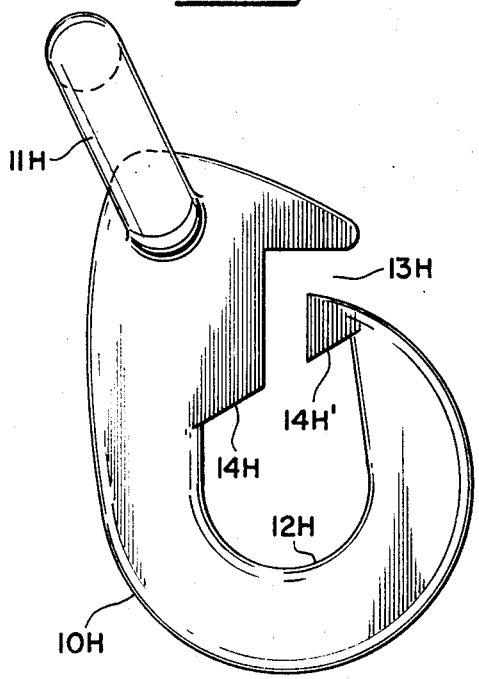
Figure 18:
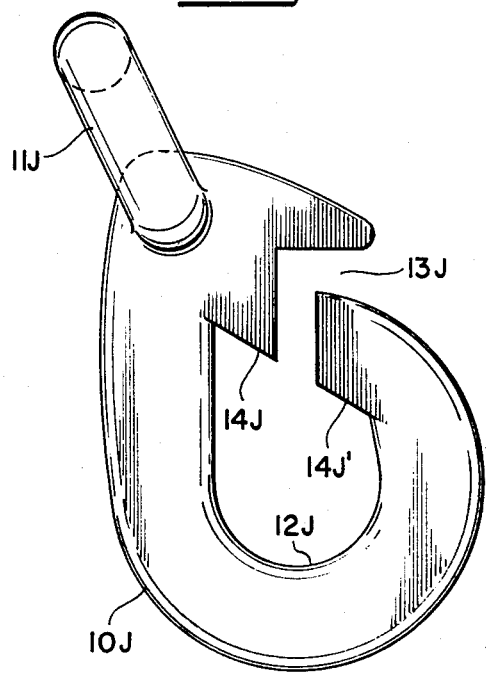

FIGS. 15 and 16 show obliquely disposed straight-side portions of the throat, with the entry passage defining a 90° turn; and FIGS. 17 and 18 show the same throat structure in a hook having a reverse eye.

Referring more particularly to the drawings:

FIG. 1 shows hook 10 with eye 11 and arcuate portion 12 of the throat, to which entry is gained through passage 13. Straight portions 14 and 14' in the throat terminate angularly at 15 and 15' respectively, where they meet the arcuate portion 12 of the hook throat.

In FIG. 2, the body of the hook 10 is shown thickened in area 16 to provide the strength that is required for an open-throated connector.

In FIG. 3 the body of the hook 10 is shown narrowed in areas 17 and 17' to facilitate entrance of chain 18 and accommodate the links adjacent the link which is being introduced into the hook through the said entry passage.

The eye 11' in FIG. 4 is disposed perpendicularly with respect to the plane of the hook, this being a "reverse eye" as commonly designated in the industry.

One form of operation of the choker hook of the present invention is shown in FIG. 5, wherein hook 10 is fastened by a conventional detachable member 19 to chain 18 around log 20. The extended length of chain 18 is passed through a key link 21, also a conventional item readily available on the market. The wide portion of key link 21 permits the chain to be drawn therethrough to achieve desired tautness, and the narrow end 22 of key link 21 locks one link of the chain, to maintain the tension and hold the log for lifting or pulling.

The straight portions 14 and 14' in the throat, terminating angularly at 15 and 15' respectively, and at passage 13, lessen the hazard of accidental disengagement because the chain cannot position itself for entry of a link into the passage when it is thrown forcibly from angle 15 on one side, across straight portions 14 and 14' to the other side (angle 15') of the hook. Rough handling of chain is common and is in fact necessitated by the nature and weight of the materials with which it is used. Therefore, the movement of the chain within the throat is likely to be forcible and attended by heavy jolts and shocks, rather than the careful positioning that is required to effect engagement and disengagement.

The hook 10A of FIG. 6 shows annular eye 11A, arcuate throat 12A and entry passage 13A, the latter achieving a 90° turn, while the remaining features of this embodiment correspond to the features of the hook of FIG. 1 and are, in FIGS. 6–10, identified by like numbers followed by the letter A.

The right-angle turn of the chain link required for its entry through passage 13A in FIG. 6 reduces still further the possibility of accidental disengagement of the chain from the hook.

Straight lines 14 and 14' in FIGS. 1 and 4, and 14A and 14A' in FIGS. 6 and 10, may be disposed, with respect to the walls of the entry passage, at right angles or oblique angles, and these are shown in the remaining FIGS. 11–18. The numbers used in FIGS. 1 and 4 to identify the various features of this hook are used in succeeding FIGS. 6, 10, and 11–18, with letters A–J, respectively. For example, lines 14 and 14' in FIGS. 1 and 4 are the straight-side portions of the throat. In FIG. 11, segments 14B and 14B' are obliquely disposed with respect to the entry passage, segment 14B being disposed at an angle greater than 90° with respect to the adjacent wall of the entry passage, and segment 14B' being disposed at an angle less than 90° with respect to the adjacent wall of said passage.

In FIG. 12 the direction of obliquity is reversed, and segment 14C defines an angle of less than 90° at its meeting with the adjacent wall of entry passage 13C, while segment 14C' is set at an angle greater than 90° with respect to the passage wall adjacent thereto.

FIGS. 13 and 14 show a like deviation from right angularity in hooks having reverse eyes.

This oblique positioning of the straight portions of the throat walls enhances the protection against accidental disengagement of the chain from the hook, because the adjacent links prevent the alignment of a center link to permit its entry into the passage.

Segments 14F and 14F' are likewise obliquely disposed, in FIG. 15, with segment 14F forming an angle greater than 90° with respect to the centerline of the entry passage at the point where it reaches the throat of the hook, and segment 14F' being disposed at an angle less than 90° with respect to said centerline.

FIG. 16 shows segment 14G forming an angle less than 90° with respect to the centerline of the entry passage, and segment 14G' defining an angle greater than 90° with respect to said centerline.

FIGS. 17 and 18 show the same respective deviation from right angles, in hooks having reverse eyes.

While lifting or moving a log, as in the logging industry, has been used as an example, it is common practice in many industries to use choker chains in the conventional manner above described. The present invention may be applied equally well to other industries.

The design of this hook at the outer end of the entry passage is such as to prevent accidental catching by the hook on brush, weeds, rocks, etc. such as would occur with a conventional slip hook. In the latter, the outermost end of a slip hook forms a reverse curve and in the uses for which this invention is intended, that outwardly curving tip would tend to catch on obstacles or pick up debris.

In an alternate embodiment, the eye shown in the drawings as an annular ring may be replaced with a shackle type closure having a pin inserted transversely through dual rings at the open end thereof. It is the purpose of this invention to provide for the slotted entry, as above described, into a hook having a throat formed on lines partially arcuate and partially straight, said straight portions meeting angularly with said arcuate portion and said slotted opening; the eye means may be of any conventional structure.

The invention having been thus disclosed, what is claimed is:

1. A hook of the type used with choker chains, having a throat partially arcuate and partially straight-sided and permitting slidable passage therethrough of a length of chain used with said hook; one of said straight sides being directly opposite the arcuate portion of the throat and being severed in the central portion thereof to provide entry to said throat through an opening having substantially parallel sides; said parallel sides having therebetween a distance sufficient to permit facile passage of any standard link of said chain when said link is disposed with the plane of said link in parallel arrangement with said sides of the opening; the walls of said throat being rounded in the arcuate portion and the walls of said severed straight-line portion defining angles of substantially 90 degrees in relation to the plane of the hook; and the walls of said opening being tapered to accommodate the links of chain adjacent the link admitted through said opening; and eye means integral with said hook.

2. The invention of claim 1 wherein said opening defines a turn.

3. The invention of claim 1 wherein said severed straight-line wall is disposed at an angle of substantially 90° with respect to the walls of the opening adjacent thereto.

4. The invention of claim 1 wherein said severed straight-line wall is disposed non-perpendicularly with respect to the adjacent walls of said opening.

* * * * *